United States Patent
Hundley et al.

(10) Patent No.: US 10,710,326 B1
(45) Date of Patent: Jul. 14, 2020

(54) OPEN CELLULAR SANDWICH STRUCTURES HAVING SEALED EDGES AND METHODS OF MANUFACTURING THE SAME

(71) Applicant: HRL Laboratories, LLC, Malibu, CA (US)

(72) Inventors: Jacob M. Hundley, Newbury Park, CA (US); Alan J. Jacobsen, Woodland Hills, CA (US); Sophia S. Yang, Los Angeles, CA (US); Zak C. Eckel, Calabasas, CA (US); Christopher S. Roper, Santa Monica, CA (US); William Carter, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 1139 days.

(21) Appl. No.: 14/197,043

(22) Filed: Mar. 4, 2014

Related U.S. Application Data

(60) Provisional application No. 61/909,259, filed on Nov. 26, 2013.

(51) Int. Cl.
*B32B 3/12* (2006.01)
*B29C 65/70* (2006.01)

(52) U.S. Cl.
CPC ............... *B32B 3/12* (2013.01); *B29C 65/70* (2013.01)

(58) Field of Classification Search
CPC ....................................................... B32B 3/12
See application file for complete search history.

(56) References Cited

U.S. PATENT DOCUMENTS

| 3,868,297 A * | 2/1975 | Jamison | B32B 3/12 |
| | | | 428/593 |
| 4,018,211 A * | 4/1977 | Barr | F24S 70/60 |
| | | | 126/621 |

(Continued)

FOREIGN PATENT DOCUMENTS

| WO | WO 96/30202 | 10/1996 |
| WO | WO 00/24559 | 5/2000 |

OTHER PUBLICATIONS

Fogarty "Honeycomb Core and the Myths of Moisture Ingression" Appl Compos Mater (2010) 17:293-307, published Dec. 15, 2009 (Year: 2009).*

*Primary Examiner* — Frank J Vineis
*Assistant Examiner* — Laura B Figg
(74) *Attorney, Agent, or Firm* — Lewis Roca Rothgerber Christie, LLP

(57) ABSTRACT

A method of manufacturing a sandwich structure having an open cellular core and a fluid-tight seal surrounding the core includes coupling a mold to a first facesheet to define a reservoir. The method also includes irradiating a volume of photo-monomer in the reservoir with a series of vertical collimated light beams to form a cured, solid polymer border extending around a periphery of the first facesheet. The method also includes irradiating a remaining volume of photo-monomer in the reservoir with a series of collimated light beams to form an ordered three-dimensional polymer microstructure core defined by a plurality of interconnected polymer optical waveguides coupled to the first facesheet and surrounded by the cured, solid polymer border. The method further includes coupling a second facesheet to the ordered three-dimensional microstructure core and the cured, solid polymer border to form the sandwich structure.

10 Claims, 11 Drawing Sheets

(56) References Cited

U.S. PATENT DOCUMENTS

| | | | |
|---|---|---|---|
| 6,450,450 B1* | 9/2002 | MacDonald | B29C 70/24 244/126 |
| 6,739,104 B2* | 5/2004 | Tokonabe | B32B 3/12 428/116 |
| 7,382,959 B1* | 6/2008 | Jacobsen | B82Y 20/00 385/129 |
| 7,653,279 B1* | 1/2010 | Jacobsen | B82Y 20/00 385/129 |
| 7,658,810 B2 | 2/2010 | Endres et al. | |
| 2003/0087049 A1 | 5/2003 | Hachenberg et al. | |
| 2006/0113131 A1* | 6/2006 | Kato | B60K 1/04 429/434 |
| 2010/0159294 A1* | 6/2010 | Fly | B29C 67/20 429/483 |
| 2010/0159303 A1* | 6/2010 | Rock | H01M 8/0232 429/507 |
| 2010/0266808 A1* | 10/2010 | Klein | B29C 43/3642 428/116 |
| 2011/0039190 A1* | 2/2011 | Owejan | H01M 8/0232 429/518 |
| 2011/0229823 A1* | 9/2011 | Rock | H01M 8/0232 430/315 |
| 2012/0315429 A1 | 12/2012 | Stamp et al. | |

* cited by examiner

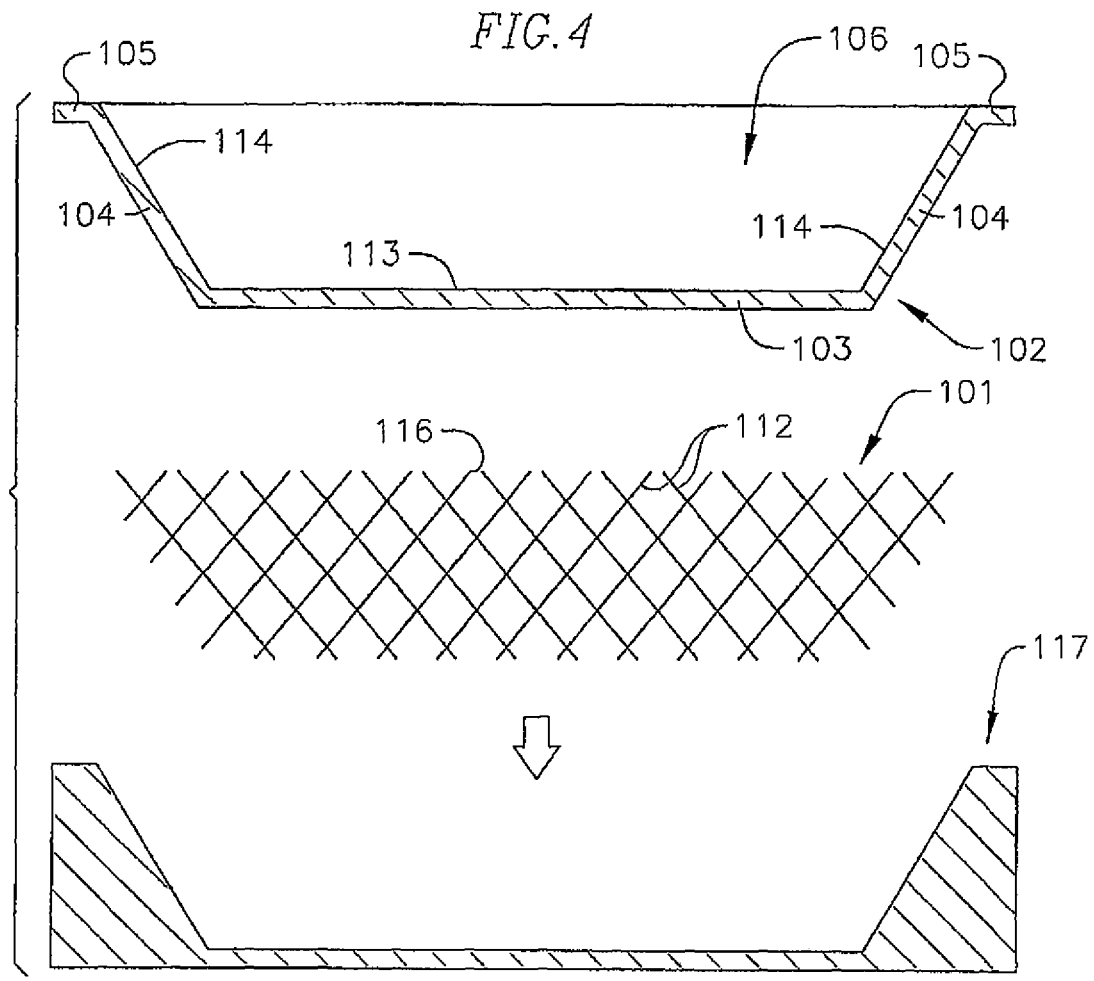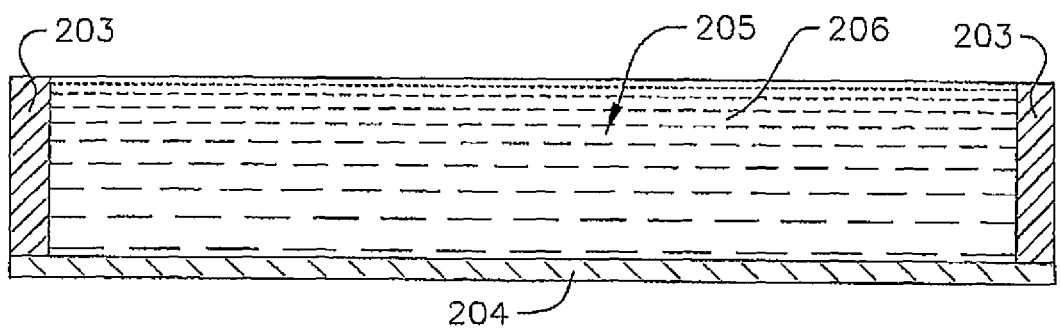

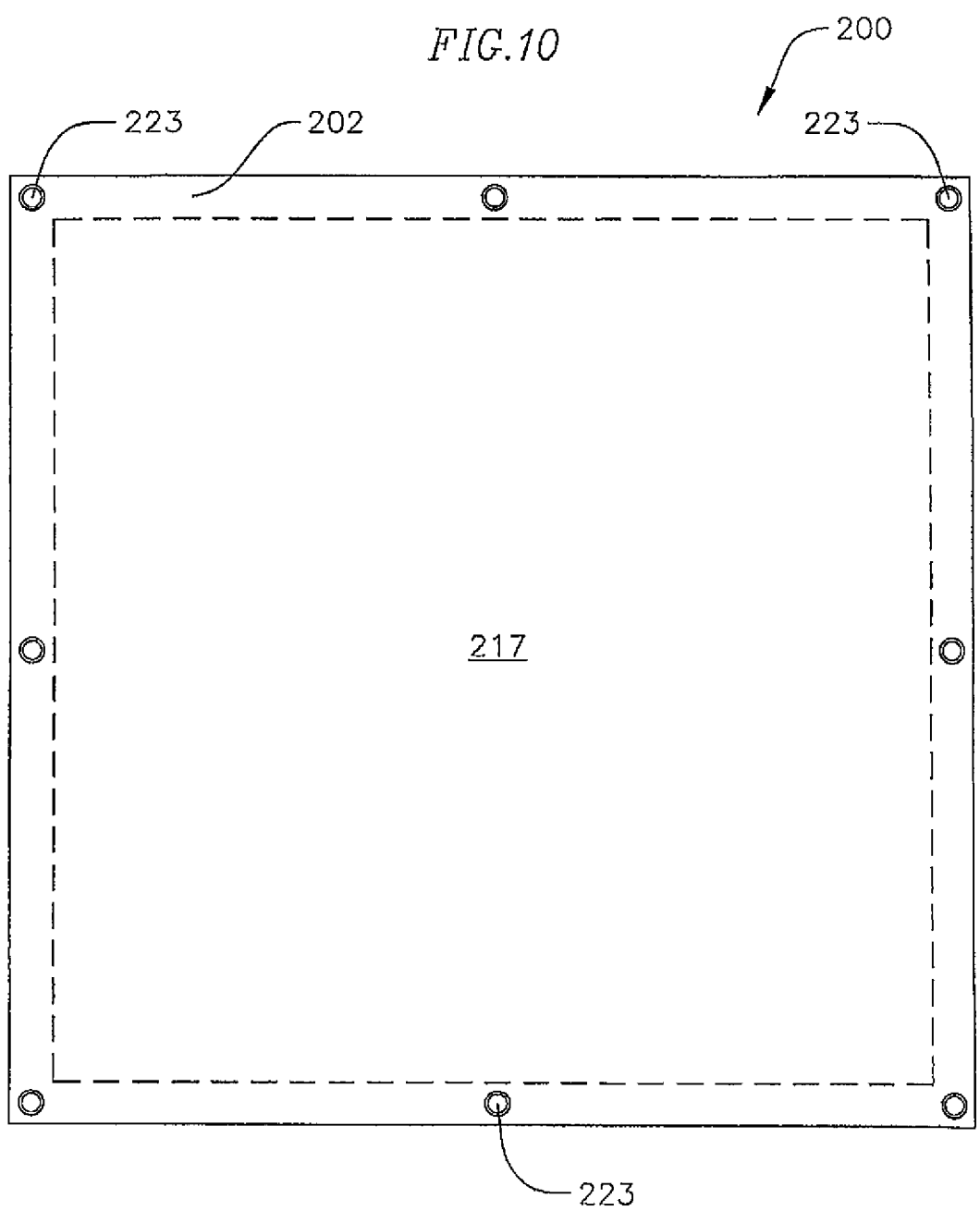

OPEN CELLULAR SANDWICH STRUCTURES HAVING SEALED EDGES AND METHODS OF MANUFACTURING THE SAME

CROSS-REFERENCE TO RELATED APPLICATION

This application claims priority to and the benefit of U.S. Provisional Application No. 61/909,259, filed Nov. 26, 2013, the entire contents of which are incorporated herein by reference.

FIELD

The present invention is directed to sandwich structures and, more particularly, open cellular sandwich structures having sealed edges.

BACKGROUND

Sandwich structures commonly include a pair of thin and rigid facesheet materials separated by a lightweight reinforcing core. Sandwich structures are widely used as structural components in both advanced aerospace and automotive designs due to their high specific strength and stiffness. Conventionally, the lightweight reinforcing core includes a closed-cell material, such as balsa wood, honeycomb, or closed-cell foam. However, closed-cell cores do not permit fluid to flow through the core. Accordingly, sandwich structures having closed-cell cores are not suitable for applications in which fluid must flow through the core, such as heat exchangers or cold plates.

Sandwich structures having a directionally open core, such as a corrugated core, may be suitable for applications in which fluid must flow through the core. However, sandwich structures having directionally open cores must be sealed to prevent fluid ingress into the core, which may damage or corrode the core, and to prevent fluid egress from the core to the surrounding environment. Conventional methods for sealing a directionally open core, such as applying a potting compound around a periphery of the core, are costly, labor-intensive, and not readily scalable. Additionally, such conventional techniques for sealing a directionally open core are impractical or ineffectual at sealing sandwich structures having a fully open cellular core in which fluid is able to flow in any direction through the core.

SUMMARY

The present disclosure is directed to various sandwich structures having an open cellular core and a fluid-tight seal surrounding the open cellular core. In one embodiment, the sandwich structure includes a first facesheet having a contoured profile. The sandwich structure also includes an ordered three-dimensional microstructure core having a series of interconnected polymer optical waveguides coupled to the first facesheet. The sandwich structure further includes a second facesheet coupled to the first facesheet. The first and second facesheets cooperate to form a fluid-tight seal around a periphery of the core. The contoured first facesheet may have any suitable shape, such as, for instance, a thin-walled trapezoidal prism or a thin-walled cuboid. The first and second facesheets may be made of any suitable material, such as metal, metal alloy, composite, polymer, or ceramic. In one embodiment, the first facesheet and the ordered three-dimensional microstructure core are formed from the same or similar material.

The present disclosure is also directed to a sandwich structure including a first facesheet having a contoured profile, an ordered three-dimensional microstructure core defined by a series of interconnected polymer optical waveguides coupled to the first facesheet, a continuous border enclosing the ordered three-dimensional microstructure core coupled to the first facesheet, and a second facesheet coupled to the continuous border. The continuous border and the first and second facesheets cooperate to form a fluid-tight seal around a periphery of the core. The continuous border may have either a solid or hollow cross-section. Additionally, the border may be formed from any suitable material, such as solid photo-polymer, metal, metal alloy, composite, polymer, or ceramic.

The present disclosure is also directed to various methods for manufacturing open cellular sandwich structures having sealed edges. In one embodiment, the method includes coupling a mold to a first facesheet to define a reservoir. The method also includes irradiating a volume of photo-monomer in the reservoir with a series of vertical collimated light beams to form a cured, solid polymer border extending around a periphery of the first facesheet. The method further includes irradiating a remaining volume of photo-monomer in the reservoir with a series of collimated light beams to form an ordered three-dimensional polymer microstructure core defined by a series of polymer optical waveguides coupled to the first facesheet and surrounded by the cured, solid polymer border. The method also includes coupling a second facesheet to the ordered three-dimensional microstructure core and the cured, solid polymer border to form the sandwich structure.

The task of irradiating the volume of photo-monomer with the series of vertical collimated light beams to form the cured, solid polymer border may include directing the series of vertical collimated light beams through a peripheral aperture in a mask covering the reservoir. The task of irradiating the remaining volume of photo-monomer with the series of collimated light beams to form the ordered three-dimensional polymer microstructure core may include directing the series of collimated light beams through a series of apertures in a mask covering the reservoir. The task of irradiating the volume of photo-monomer with the series of vertical collimated light beams to form the cured, solid polymer border may be performed simultaneously with the task of irradiating the volume of photo-monomer with the series of collimated light beams to form the ordered three-dimensional polymer microstructure core. The method may also include removing the mold before coupling the second facesheet to the ordered three-dimensional microstructure core. The method may further include removing unpolymerized photo-monomer from the reservoir before coupling the second facesheet to the ordered three-dimensional microstructure core. The method may also include coupling a seal around a periphery of the core and the upper and lower facesheets. The seal may have any suitable shape, such as a C-shaped cross-section. The method may also include forming at least one opening in the cured, solid polymer border for receiving a fastener.

According to another embodiment of the present disclosure, a method for manufacturing an open cellular sandwich structure having a sealed periphery includes coupling a sacrificial mold to a first facesheet to define a reservoir. The method also includes irradiating a volume of photo-monomer in the reservoir with a series of collimated light beams to form an ordered three-dimensional polymer microstructure core defined by a series of interconnected polymer optical waveguides coupled to the first facesheet and surrounded by the sacrificial mold. The method further includes coupling a second facesheet to the ordered three-dimensional microstructure core and the sacrificial mold to form the sandwich structure with the sealed periphery.

The method may include removing unpolymerized photo-monomer from the reservoir before coupling the second facesheet to the ordered three-dimensional microstructure core. The second facesheet may be coupled to the core and the sacrificial mold by dissimilar processes. For instance, the second facesheet may be bonded to the core by an epoxy paste adhesive and welded to the sacrificial mold by friction stir welding. Additionally, the sacrificial mold may have any desired shape, such as a rectangular tube defining an internal cavity.

According to a further embodiment of the present disclosure, a method for manufacturing an open cellular sandwich structure having a sealed periphery includes irradiating a volume of photo-monomer in a mold having a contoured profile with a series of collimated light beams to form an ordered three-dimensional polymer microstructure core defined by a series of interconnected polymer optical waveguides. The method also includes coupling a first facesheet to the ordered three-dimensional microstructure core to form the sandwich structure with the sealed periphery. The mold and the first facesheet may cooperate to form a fluid-tight seal around the periphery of the core.

The method may also include applying a release agent to the mold, removing the mold from the ordered three-dimensional polymer microstructure core, and coupling the ordered three-dimensional polymer microstructure core to a second facesheet having a contoured profile. The contoured profile of the second facesheet may substantially match the contoured profile of the mold.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

FIG. 4 illustrates a task of removing the contoured mold from the core and a task of coupling the core to a contoured lower facesheet according to one embodiment of the present disclosure;

FIG. 5 illustrates a task of coupling a mold to a lower facesheet to form a reservoir and a task of filling the reservoir with a volume of liquid photo-monomer, according to another embodiment of the present disclosure;

FIG. 10 illustrates a task of forming a plurality of openings in the cured polymer border, according to one embodiment of the present disclosure;

DETAILED DESCRIPTION

The present disclosure is directed to various methods for sealing a periphery of a sandwich structure having an open cellular core. Sandwich structures having an open cellular core are configured to permit fluid to flow in all directions through the core. Accordingly, when the sandwich structure is used as a purely structural component, the sandwich structure may be sealed to prevent fluid ingress into the open cellular core, which might otherwise degrade or corrode the core and increase the weight of the sandwich structure. Additionally, if the sandwich structure is used to perform additional functions, such as for acoustic isolation, active heating or cooling, and/or fluid storage (e.g., a structural fuel tank), the periphery of the sandwich structure may be sealed to prevent fluid egress from the open cellular core to the surrounding environment. In one or more embodiments of the present disclosure, the method of sealing the periphery of the sandwich structure is performed concurrently with fabrication of the sandwich structure itself, which is both cost-effective and time-efficient.

Figure 1A:
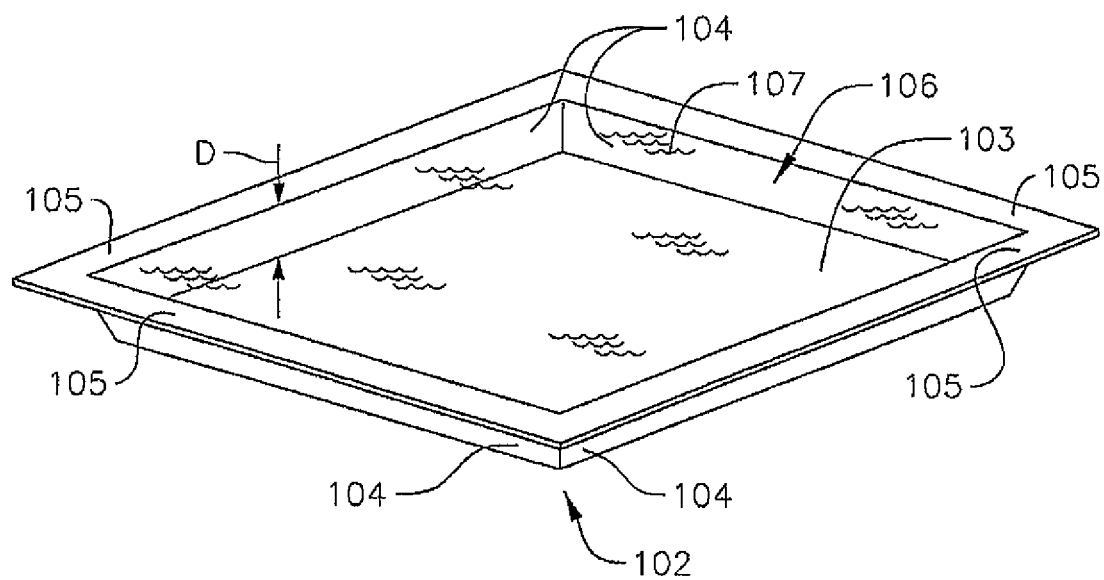
FIGS. 1A and 1B are a perspective view and a cross-sectional view, respectively, illustrating a task of filling a contoured mold with a volume of liquid photo-monomer according to one embodiment of the present disclosure.
Figure 1B:
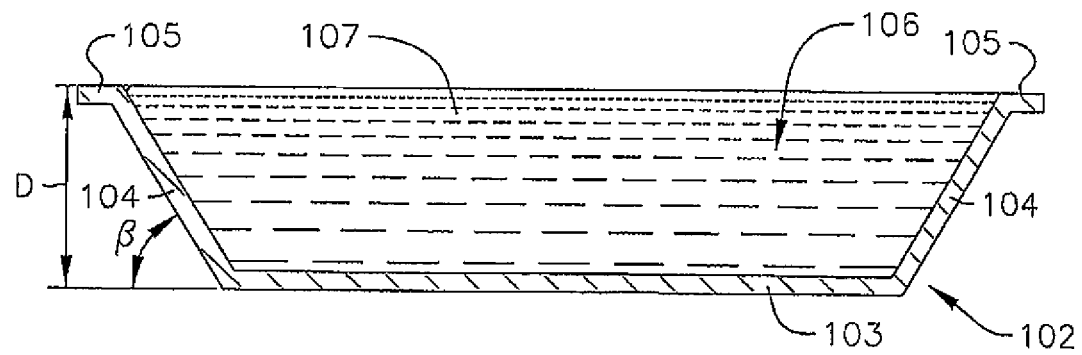

With reference now to the embodiment illustrated in FIGS. 1A and 1B, a method of sealing a periphery of a sandwich structure 100 having an open cellular core 101 includes a task of selecting a contoured mold 102 having any suitable size and shape depending upon the desired size and shape of the open cellular core 101. In the illustrated embodiment, the contoured mold 102 is a thin-walled trapezoidal prism having a flat, square base plate 103, four canted sidewalls 104 extending upward and outward from edges of the square base plate 103, and four lips or flanges 105 extending outward from upper ends of the canted sidewalls 104. In one or more alternate embodiments, the contoured mold 102 may have any other suitable shape suitable for the intended application of the sandwich structure 100. For instance, in one embodiment, the contoured mold 102 may be a thin-walled rectangular prism (i.e., a cuboid) having a flat, rectangular base and four straight sidewalls extending upward from edges of the flat, rectangular base. In another embodiment, the contoured mold 102 may include a flat base and a plurality of curved sidewalls extending upward from a periphery of the base. Additionally, although the base 103 of the contoured mold 102 in the illustrated embodiment is flat, in one or more alternate embodiments, the base may be curved (e.g., the base 103 of the contoured mold 102 may be dome-shaped and/or may include compound out-of-plane curvature). Furthermore, the base 103 of the contoured mold 102 may be flat on one surface and contoured on the opposing surface. The base 103 of the contoured mold 102 may also have any desired shape, such as, for instance, circular.

Moreover, the contoured mold 102 may have any suitable size depending upon the desired size of the open cellular core 101. In one non-limiting embodiment in which the contoured mold 102 is a thin-walled trapezoidal prism, the distance between the base 103 and the outwardly turned flanges 105 is approximately or about ½ inch (i.e., the contoured mold 102 has a depth D of approximately or about ½ inch), the canted sidewalls 104 are deflected upward and outward at an angle β of approximately or about 60 degrees relative to the base 103, and the base 103 is approximately or about 6 inches wide and approximately or about 6 inches long. These dimensions are provided only as an example of one suitable size of the contoured mold 102, and are not intended to limit the range of suitable sizes of the contoured mold 102. A person of ordinary skill in the art will appreciate that contoured mold 102 may have any other suitable dimensions (e.g., any other suitable depth D, any other suitable sidewall 104 deflection angle β, and any other suitable combination of length and width of the base 103) suitable for the intended application of the sandwich structure 100. The contoured mold 102 may be formed from any suitable material, such as, for instance, aluminum, steel, other metal alloys, composite (e.g., carbon fiber reinforced plastic), polymer, ceramic, or any combination thereof. Further, the contoured mold 102 may have any suitable thickness. In one embodiment, the base plate 103, the canted sidewalls 104, and the outwardly turned flanges 105 are each approximately or about 0.04 inches thick. The contoured mold 102 may be formed by any suitable process, such as, for instance, casting, molding, forging, bending, stamping, machining, welding, injection molding, or any combination thereof.

Together, the base 103 and the sidewalls 104 of the contoured mold 102 define a reservoir or chamber 106, as illustrated in FIGS. 1A and 1B. In the illustrated embodiment, the method also includes a task of filling the reservoir 106 with a volume of liquid photo-monomer 107 that is configured to polymerize when exposed to light within a particular range of wavelengths, such as, for instance, ultraviolet light (i.e., wavelengths between 250 nm and 400 nm). The liquid photo-monomer 107 may be any suitable kind of monomer formulated to polymerize when exposed to light, such as, for instance, urethanes (e.g., polyurethanes), acrylates, methacrylates, or cationic polymers (e.g., photo-cured epoxies).

Figure 2:
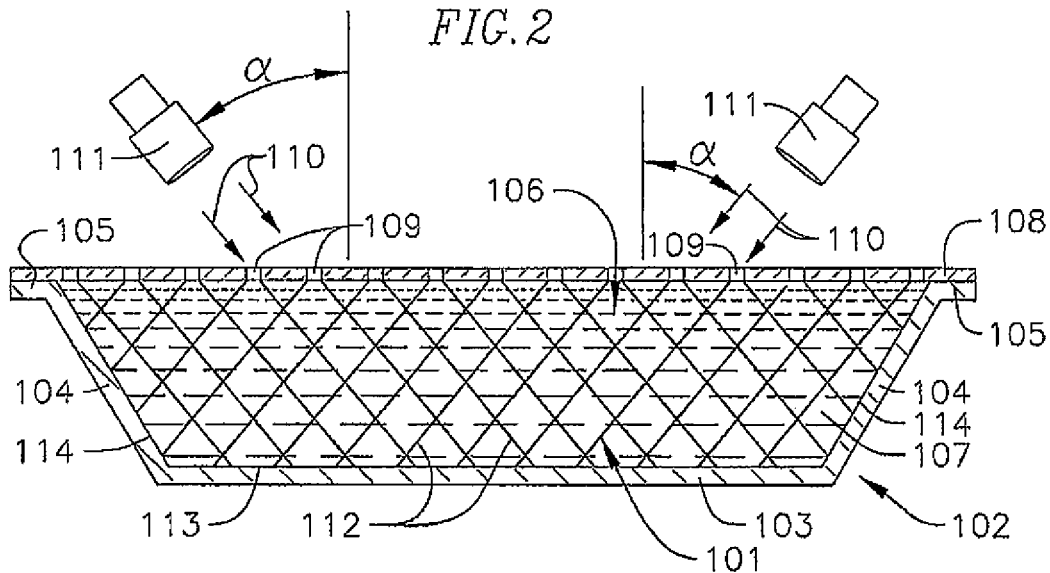
FIG. 2 illustrates a task of covering the contoured mold with a mask and a task of irradiating the volume of liquid photo-monomer with a plurality of light beams to form an open cellular core, according to one embodiment of the present disclosure.

With reference now to the embodiment illustrated in FIG. 2, the method also includes a task of covering an upper end of the reservoir 106 with a mask 108 (i.e., the method includes placing the mask 108 on the upper surface of the volume of photo-monomer 107 in the reservoir 106 and on the outwardly turned flanges 105 of the contoured mold 102). In the illustrated embodiment, the mask 108 defines a plurality of light-transmitting apertures 109. The mask 108 may define any desired number of apertures 109 and the apertures 109 may have any desired shape, depending upon the desired characteristics of the open cellular core 101, as described below in more detail. Additionally, the mask 108 may be made of any suitable material, such as, for instance, biaxially-oriented polyethylene terephthalate.

Still referring to the embodiment illustrated in FIG. 2, the method also includes a task of irradiating the volume of photo-monomer 107 in the reservoir 106 with a plurality of collimated light beams 110 (e.g., ultraviolet light beams) from one or more light sources 111. The task of irradiating the photo-monomer 107 includes directing the collimated light beams 110 from the one or more light sources 111 through the plurality of apertures 109 in the mask 108. Regions of the liquid photo-monomer 107 that are exposed to the collimated light beams 110 cure (i.e., polymerize). Moreover, the index of refraction of the polymerized regions differs from the index of refraction of the unpolymerized liquid photo-monomer 107. This index of refraction difference between the polymerized regions and unpolymerized photo-monomer 107 tends to "trap" and "focus" the collimated light beams 110 to a tip of the polymerized regions, which causes the polymerized regions to grow and propagate through the volume of photo-monomer 107 to form polymerized optical waveguides 112. That is, the difference between the index of refraction of the liquid photo-monomer 107 and the polymerized regions causes the collimated light beams 110 to internally reflect and focus at the tips of the polymerized regions, which causes the photo-monomer 107 near the tips of the polymerized regions to polymerize. This process continues such that the polymerized regions propagate down through the volume of photo-monomer 107 and form the polymer optical waveguides 112. Suitable methods for forming polymer optical waveguides 112 are described in U.S. Pat. Nos. 7,653,279 and 7,382,959, the entire content of both of which are incorporated herein by reference.

The direction in which the polymer optical waveguides 112 propagate through the volume of photo-monomer 107 is a function of an incident angle α of the one or more light sources 111, and the light beams 110 produced therefrom, relative to an imaginary axis perpendicular to the mask 108 (i.e., the orientation of the polymer optical waveguides 112 is a function of the angles α at which the one or more collimated light beams 110 strike the volume of photo-monomer 107 in the reservoir 106). Accordingly, in one embodiment, the method may include a task of positioning the one or more light sources 111 at a first incident angle $\alpha_1$ and directing one or more light beams 110 through the apertures 109 in the mask 108 at the first incident angle $\alpha_1$ to form polymer optical waveguides 112 extending along the first incident angle $\alpha_1$. The method may also include a task of repositioning the one or more light sources 111 to a second incident angle $\alpha_2$ and directing one or more collimated light beams 110 through the apertures 109 in the mask 108 at the second incident angle $\alpha_2$ to form polymer optical waveguides 112 extending along the second incident angle $\alpha_2$. In one embodiment, the method also includes a task of repositioning the light sources 111 to third and fourth incident angles $\alpha_3$, $\alpha_4$, respectively, to form polymer optical waveguides 112 extending along the third and fourth incident angles $\alpha_3$, $\alpha_4$, respectively. In one embodiment, the incident angles $\alpha_1$, $\alpha_2$, $\alpha_3$, $\alpha_4$, are each approximately 45 degrees. Additionally, in one embodiment, the method includes positioning the light sources 111 around an imaginary axis perpendicular to the mask 108 (e.g., positioning each of the light sources 111 at approximately 90 degree increments revolved around an imaginary axis perpendicular to the mask 108). In one or more alternative embodiments, the method may include positioning the light sources 111 at any other desired angles $\alpha$. Additionally, although in one embodiment the method includes repositioning the one or more light sources 111 into four different incident angle positions $\alpha_1$, $\alpha_2$, $\alpha_3$, $\alpha_4$, it will be appreciated that the method may include positioning the light sources 111 into any suitable number of different incident angles $\alpha$, such as, for instance, from two to ten different angular positions, and still fall within the scope and spirit of the present disclosure. In the illustrated embodiment, the polymer optical waveguides 112 intersect each other and are polymerized together into a single, unitary lattice microstructure. Together, the polymer optical waveguides 112 define the open cellular ordered three-dimensional polymer microstructure core 101 of the sandwich structure 100.

In another embodiment, the method may include placing a plurality of fixed light sources 111 at different incident angles $\alpha$, such as, for instance, at four different angles, and directing the light beams 110 into the volume of photo-monomer 107 in the reservoir 106 through the plurality of apertures 109 in the mask 108. Accordingly, it will be appreciated that the polymer optical waveguides 112 may be formed by one or more fixed position light sources 111, one or more repositionable light sources 111, or a combination of fixed position and repositionable light sources 111. The light sources 111 may be any suitable kind of lamps capable of emitting light beams 110 within a range of wavelengths configured to polymerize the liquid photo-monomer 107, such as, for instance, a mercury arc lamp.

With continued reference to the embodiment illustrated in FIG. 2, the length to which the polymer optical waveguides 112 propagate through the volume of photo-monomer 107 in the reservoir 106 is a function of several factors, including the size, intensity, and exposure time of the incident light beams 110 and the light absorption/transmission properties of the liquid photo-monomer 107. Accordingly, in one embodiment, the method includes a task of selecting one or more light sources 111 configured to produce light beams 110 having a suitable intensity and exposing the volume of photo-monomer 107 in the reservoir 106 to the light beams 110 for a sufficient duration such that the polymer optical waveguides 112 propagate all the way down through the reservoir 106 and adhere to inner surfaces 113, 114 of the base 103 and the sidewalls 104, respectively, of the contoured mold 102.

The cross-sectional shape and size of the polymer optical waveguides 105 is a function of the shape and size of the collimated light beams 110, which in turn are dependent upon the shape and size of the apertures 109 in the mask 108. The apertures 109 in the mask 108 may have any desired shape, such as, for instance, triangular, pentagonal, hexagonal, polygonal, oval, or star-shaped. Accordingly, the method may also include a task of selecting a mask 108 having apertures 109 with a shape and size corresponding to the desired cross-sectional shape and size of the polymer optical waveguides 112 of the open cellular core 101.

The spacing between the apertures 109 in the mask 108 and the number of collimated light beams 110 directed through the apertures 109 will determine the density of the polymer optical waveguides 112 and the open volume fraction of the open cellular core 101 (i.e., the volume ratio of air to polymer optical waveguides 112 in the core 101). Accordingly, the method may include a task of selecting a mask 108 having a desired spacing between the apertures 109 and a task of directing a desired number of collimated light beams 110 through the apertures 109 based upon the desired density of the polymer optical waveguides 112 in the open cellular core 101.

Figure 3:
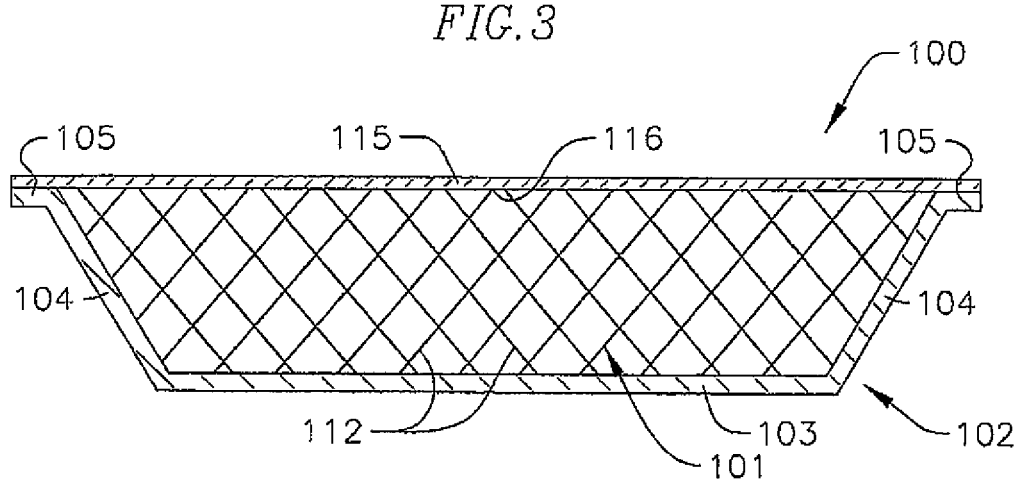
FIG. 3 illustrates a task of coupling an upper facesheet to an upper end of the core, according to one embodiment of the present disclosure.

With reference now to the embodiment illustrated in FIG. 3, the method may also include a task of removing unpolymerized photo-monomer 107 from the reservoir 106, thereby leaving the polymer optical waveguides 112 defining the open cellular ordered three-dimensional microstructure core 101 (i.e., the method may include a task of removing the photo-monomer 107 from the reservoir 106 that was not polymerized into polymer optical waveguides 112 during the task of irradiating the volume of liquid photo-monomer 107 in the reservoir 106 with collimated light beams 110). The task of removing the unpolymerized photo-monomer 107 from the reservoir 106 may be performed by any suitable process, such as, for instance, applying a solvent that dissolves the unpolymerized photo-monomer 107 but not the polymer optical waveguides 112. The method may also include a task of removing the mask 108 following the task of irradiating the volume of photo-monomer 107 with a plurality of collimated light beams 110.

With continued reference to the embodiment illustrated in FIG. 3, the method also includes a task of coupling an upper facesheet 115 to an upper surface 116 of the open cellular ordered three-dimensional polymer microstructure core 101 and the outwardly turned flanges 105 on the upper end of the contoured mold 102 to form the sandwich structure 100 (i.e., the method includes a task of coupling the upper facesheet 115 to upper ends of the polymer optical waveguides 112 and the contoured mold 102). The upper facesheet 115 may have any suitable shape, such as, for instance, square, rectangular, circular, or even an irregular shape. The upper facesheet 115 may have any suitable thickness, such as, for instance, from approximately or about 0.03 inches to approximately or about 0.25 inches, depending upon the intended application of the sandwich structure 101. Although the upper facesheet 115 in the illustrated embodiment is flat, in one or more alternate embodiments the upper facesheet 115 may be non-planar (e.g., the upper facesheet 115 may be dome-shaped and/or include compound out-of-plane curvature). Additionally, the upper facesheet 115 may be formed from any suitable material, such as, for instance, aluminum, steel, other metal alloys, carbon fiber reinforced plastic, unreinforced plastic, or any combination thereof. The task of coupling the upper facesheet 115 to the upper surface 116 of the core 101 and the upper end of the contoured mold 102 may be performed by any suitable process, such as, for instance, welding (e.g., inert gas welding, linear friction welding, vibration welding, or friction-stir welding), brazing, bonding, or any combination thereof. Additionally, in one or more embodiments, the upper facesheet 115 may be coupled to the core 101 and the contoured mold 102 by dissimilar processes. For instance, in one embodiment, the upper facesheet 115 may be bonded to the core 101 by an epoxy paste adhesive and welded to the contoured mold 102 by friction stir welding.

According to the embodiment illustrated in FIGS. 1A-3, the contoured mold 102 is used as the lower facesheet of the sandwich structure 101 (i.e., the contoured mold 102 functions as both a mold for forming the open cellular core 101 and the lower facesheet of the sandwich structure 101). Using the contoured mold 102 as the lower facesheet is less time-consuming and costly than removing the open cellular core 101 from the contoured mold 102 and then coupling a separate lower facesheet to the core 101. Together, the upper facesheet 115 and the lower facesheet (e.g., the contoured mold 102) cooperate to form a fluid-tight seal around a periphery of the core 101. As used herein, the term "cooperate" refers to upper facesheet 115 and the lower facesheet (e.g., the contoured mold 102) jointly functioning to form the fluid-tight seal around the periphery of the core 101.

In an alternate embodiment illustrated in FIG. 4, however, the method may include a task of removing the contoured mold 102 from the open cellular core 101 (i.e., the method may include a task of separating the contoured mold 102 from the core 101 after the task of irradiating the volume of photo-monomer 107 with the collimated light beams 110). The removed mold 102 may be cleaned and then reused in subsequent sandwich structure manufacturing operations. The method may also include a task of coupling a separate lower facesheet 117 to the open cellular core 101 after the contoured mold 102 has been removed. In one embodiment, the lower facesheet 117 may have the same or similar shape and size as the contoured mold 102. The lower facesheet 117 may be coupled to the open cellular core 101 (i.e., the polymer optical waveguides 112) by any suitable process, such as, for instance, welding (e.g., inert gas welding, linear friction welding, vibration welding, or friction-stir welding), brazing, bonding, or any combination thereof. In the embodiment illustrated in FIG. 4, the method may include a task of applying a release agent or other suitable non-stick coating to the inner surfaces 113, 114 of the base 103 and the sidewalls 104, respectively, of the contoured mold 102 before the task of filling the reservoir 106 with the volume of liquid photo-monomer 107. The release agent is configured to aid in removal of the contoured mold 102 from the open cellular core 101 without deforming or damaging the open cellular core 101 (i.e., the release agent is configured to prevent the polymer optical waveguides 112 of the open cellular core 101 from adhering to the inner surfaces 113, 114 of the contoured mold 102 such that the open cellular core 101 is configured to retain its shape when the contoured mold 102 is separated from the open cellular core 101). The upper facesheet 115 may then be coupled to the upper surface 116 of the open cellular core 101 and an upper end of the contoured lower facesheet 117 by any suitable process, such as, for instance, welding (e.g., inert gas welding, linear friction welding, vibration welding, or friction-stir welding), brazing, bonding, or any combination thereof.

With reference now to the embodiment illustrated in FIGS. 5-8, a method of sealing a periphery of a sandwich structure 200 having a reinforcing open cellular core 201 includes forming a cured, solid polymer border or picture frame 202 around the core 201. According to the embodiment illustrated in FIG. 5, the method includes a task of forming a mold 203 around a periphery of a lower facesheet 204. Together, the mold 203 and lower facesheet 204 define a reservoir or chamber 205. The method also includes a task of filling the reservoir 205 with a volume of liquid photo-monomer 206 that is configured to polymerize when exposed to light within a particular range of wavelengths (e.g., ultraviolet light). The lower facesheet 204 may have any suitable shape, such as, for instance, square, circular, rectangular, or even irregularly shaped. The lower facesheet 204 may have any suitable size depending upon the desired size of the open cellular core 201. In one non-limiting embodiment, the lower facesheet 204 has a width of approximately or about 6 inches and a length of approximately 6 inches. Further, the lower facesheet 204 may have any suitable thickness. In one non-limiting embodiment, the lower facesheet 204 is approximately or about 0.04 inches thick. A person of ordinary skill in the art will appreciate that the lower facesheet 204 may have any other suitable dimensions (e.g., any other suitable combination of length and width, and any other suitable thickness) depending on the intended application of the sandwich structure 200. Additionally, although the lower facesheet 204 in the illustrated embodiment is flat, in one or more alternate embodiments the lower facesheet 204 may be non-planar. For instance, in one embodiment, the lower facesheet 204 may be curved in three-dimensional space (e.g., the lower facesheet 204 may be dome-shaped). Additionally, in another embodiment, the lower facesheet 204 may include compound out-of-plane curvature.

Figure 6A:
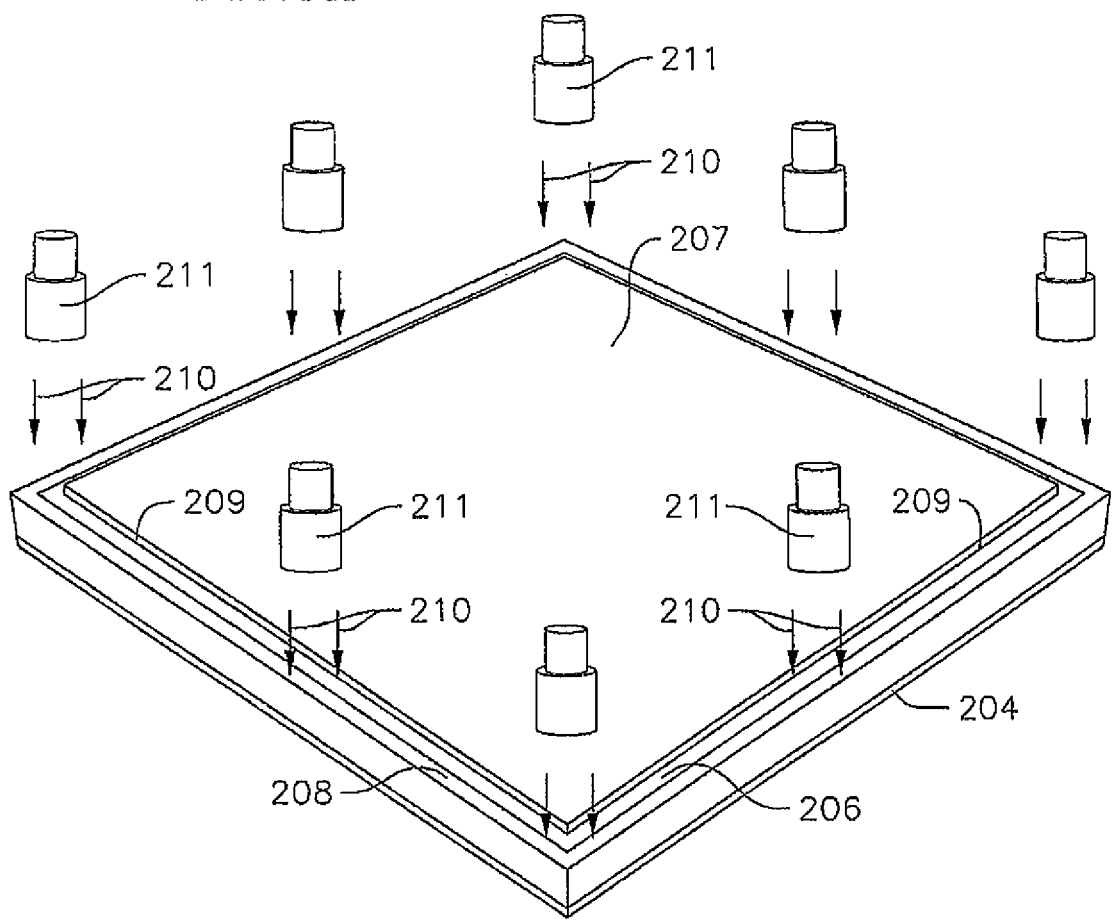
FIGS. 6A and 6B are a perspective view and a cross-sectional view, respectively, illustrating a task of covering the reservoir with a mask and a task of irradiating the photo-monomer by directing a plurality of vertical light beams down through a periphery of the mask to form a cured polymer border, according to one embodiment of the present disclosure.
Figure 6B:
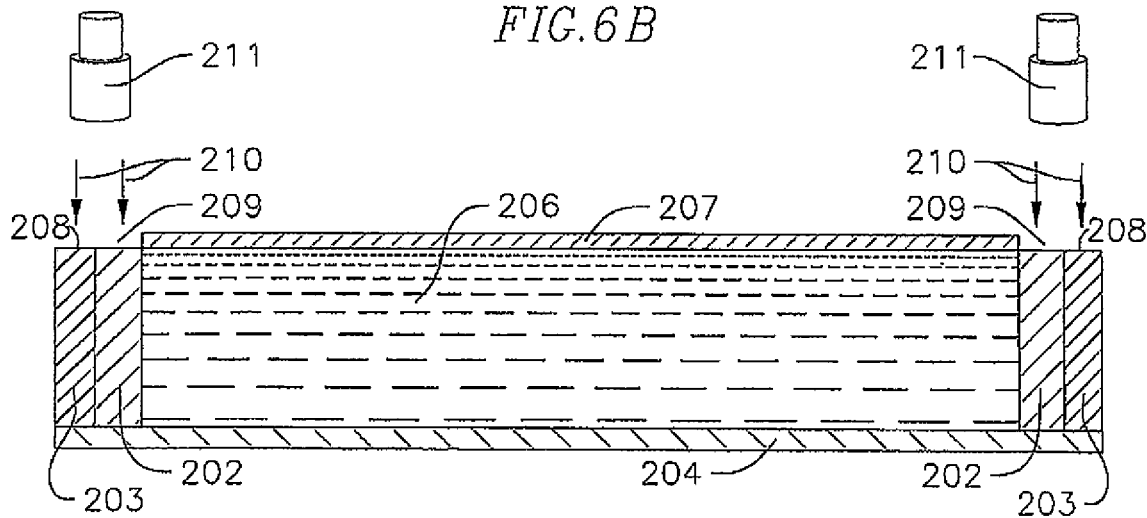

With reference now to the embodiment illustrated in FIGS. 6A and 6B, the method also includes a task of covering an upper end of the reservoir 205 with a mask 207 (i.e., the method includes a task of placing the mask 207 on an upper surface of the volume of photo-monomer 206 in the reservoir 205 and on an upper end 208 of the mold 203). In the illustrated embodiment, the mask 207 defines an aperture 209 (e.g., a cutout) extending around a periphery of the mask 207. The peripheral aperture 209 in the mask 207 is configured to overlie a periphery of the reservoir 205 when the mask 207 is placed on the upper end of the reservoir 205. Although in the illustrated embodiment the peripheral aperture 209 in the mask 207 is rectangular, in one or more alternate embodiments, the peripheral aperture 209 in the mask 207 may have any other desired shape, such as, for instance, circular. Additionally, in one embodiment, the shape of the peripheral aperture 209 in the mask 207 may substantially match the shape of the periphery of the lower facesheet 204. In another embodiment, the mask 207 may be sized such that the periphery of the reservoir 205 is not covered by the mask 207 (i.e., in one embodiment, the surface area of the mask 207 may be smaller than the surface area of the upper surface of the reservoir 205 such that the periphery of the reservoir 205 is not covered by the mask 207).

Still referring to the embodiment illustrated in FIGS. 6A and 6B, the method includes a task of irradiating the volume of photo-monomer 206 in the reservoir 205 with a plurality of vertical collimated light beams 210 (e.g., ultraviolet light beams) from one or more vertically oriented light sources 211. The task of irradiating the photo-monomer 206 includes directing the vertical collimated light beams 210 from the one or more vertically oriented light sources 211 down through the peripheral aperture 209 in the mask 207 or, in an alternate embodiment, down through the peripheral portion of the reservoir 205 that is not covered by the mask 207. In the illustrated embodiment, a sufficient number of vertical light beams 210 are directed down into the volume of photo-monomer 206 such that the cured border or picture frame 202 is formed around the periphery of the lower facesheet 204 and the periphery of the reservoir 205 (i.e., the volume of photo-monomer 206 exposed to the vertical light beams 210 polymerizes into a solid wall of polymer 202 extending around the periphery of the lower facesheet 204 and the periphery of the reservoir 205). Although in the illustrated embodiment the cured polymer border 202 is rectangular, in one or more embodiments, the cured polymer border 202 may have any other suitable shape, such as, for instance, circular. Additionally, in one embodiment, the shape of the cured polymer border 202 conforms to the shape of the periphery of the lower facesheet 204. In an alternate embodiment, the shape of the cured polymer border 202 may differ from the shape of the periphery of the lower facesheet 204. Further, in the illustrated embodiment, the cured polymer border 202 abuts against the mold 203, although in one or more alternate embodiments, the cured polymer border 202 may be spaced apart from the mold 203. The cured polymer border 202 is configured to create a fluid-tight seal around the core 201 of the sandwich structure 200, described below. The cured polymer border 202 may have any desired thickness, such as, for instance, from approximately $\frac{1}{16}$ inch to approximately $\frac{1}{2}$ inch.

With reference now to the embodiment illustrated in FIGS. 6A-7B, the method also includes a task of irradiating regions of a remaining volume of photo-monomer 206' in the reservoir 205 with a plurality of collimated light beams 212 (e.g., ultraviolet light beams) to form the open cellular core 201 (i.e., the method includes a task of forming the open cellular core 201 by directing a plurality of collimated light beams 212 into the volume of photo-monomer 206' that was not polymerized into the cured polymer border 202). The task of irradiating regions of the remaining volume of photo-monomer 206' includes directing the collimated light beams 212 from one or more light sources 213 down through one or more apertures 214 in the mask 207. According to one embodiment, the mask 207 used to form the cured polymer border 202 may be replaced by a separate mask having a plurality of apertures for forming the open cellular core 201. In another embodiment, the same mask 207 that was used to form the cured polymer border 202 may be used to form the open cellular core 201. In one embodiment, the mask 207 used to form the cured polymer border 202 may have a plurality of apertures 214 that are masked off during the task of forming the cured polymer border 202. According to this embodiment, the method may include a task of removing the masks covering the plurality of apertures 214 in the mask 207 before irradiating the remaining volume of photo-monomer 206' with a plurality of collimated light beams 212 to form the open cellular core 201 (i.e., the mask 207 may include a plurality of apertures 214 that are covered during the task of forming the cured polymer border 202 and subsequently uncovered before the task of forming the open cellular core 201).

As described above, regions of the liquid photo-monomer 206' that are exposed to the collimated light beams 212 cure (i.e., polymerize) into a plurality of polymer optical waveguides 215. Together, the polymer optical waveguides 215 define the open cellular ordered three-dimensional polymer microstructure core 201 of the sandwich structure 200. In the illustrated embodiment, the polymer optical waveguides 215 intersect each other and are polymerized together into a single, unitary lattice microstructure core 201. Any suitable number of collimated light beams 212 may be directed into the volume of photo-monomer 206' and the collimated light beams 212 may be directed into the volume of photo-monomer 206' at any suitable angles depending upon the desired characteristics of the open cellular core 201.

Figure 7A:
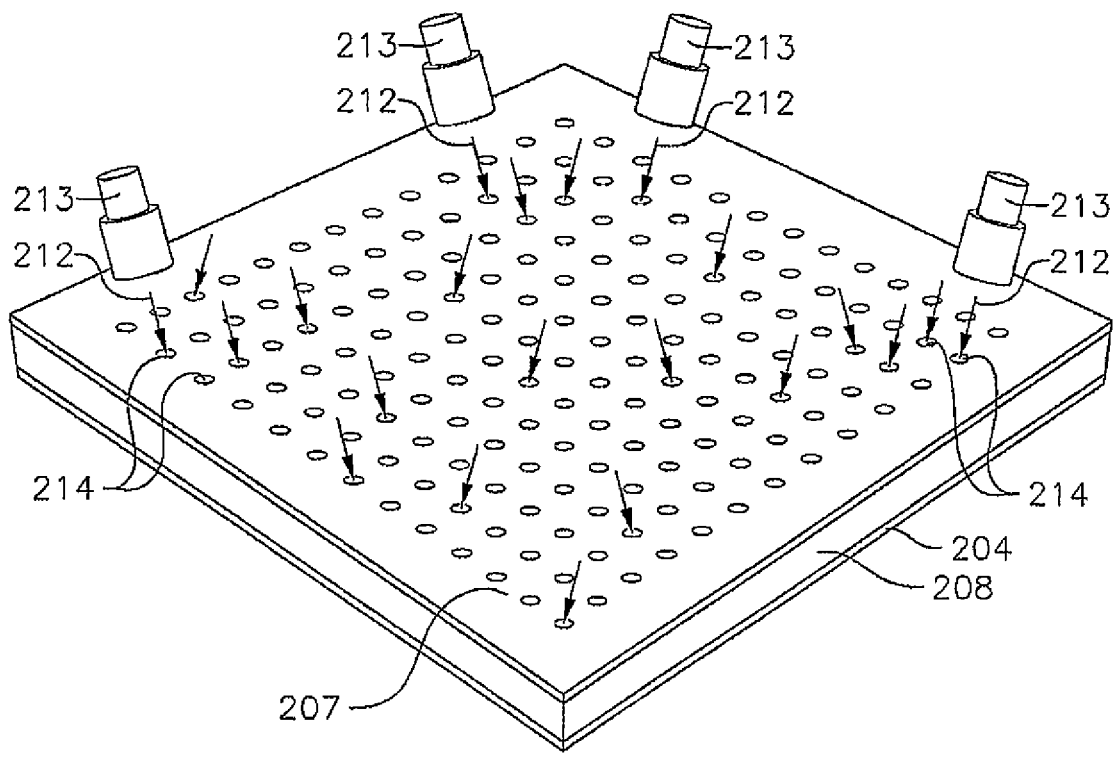
FIGS. 7A and 7B are a perspective view and a cross-sectional view, respectively, illustrating a task of irradiating a remaining volume of liquid photo-monomer with a plurality of light beams to form an open cellular core, according to one embodiment of the present disclosure.
Figure 7B:
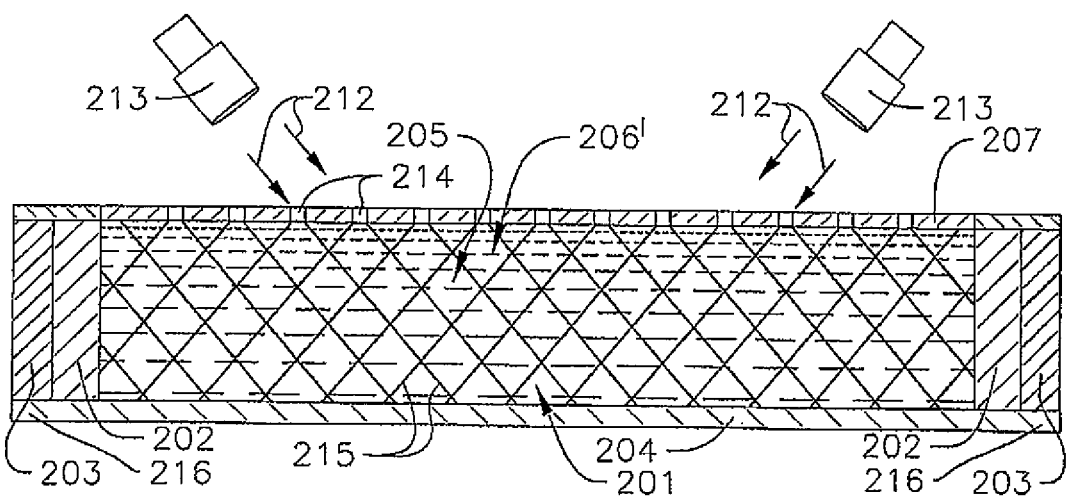

In the embodiment illustrated in FIGS. 7A and 7B, the task of irradiating the photo-monomer 206 with one or more vertical collimated light beams 210 to form the cured, solid polymer border 202 is performed before the task of irradiating the photo-monomer 206' with one or more collimated light beams 212 to form the open cellular core 201. In one or more alternate embodiments, the task of irradiating the photo-monomer 206' with one or more light beams 212 to form the open cellular core 201 may be performed before the task of irradiating the photo-monomer 206 with one or more vertical light beams 210 to form the cured, solid polymer border 202. Additionally, in one or more embodiments, the task of irradiating the photo-monomer 206' with one or more collimated light beams 212 to form the open cellular core 201 may be performed simultaneously with the task of irradiating the photo-monomer 206 with one or more vertical collimated light beams 210 to form the cured, solid polymer border 202.

Figure 8:
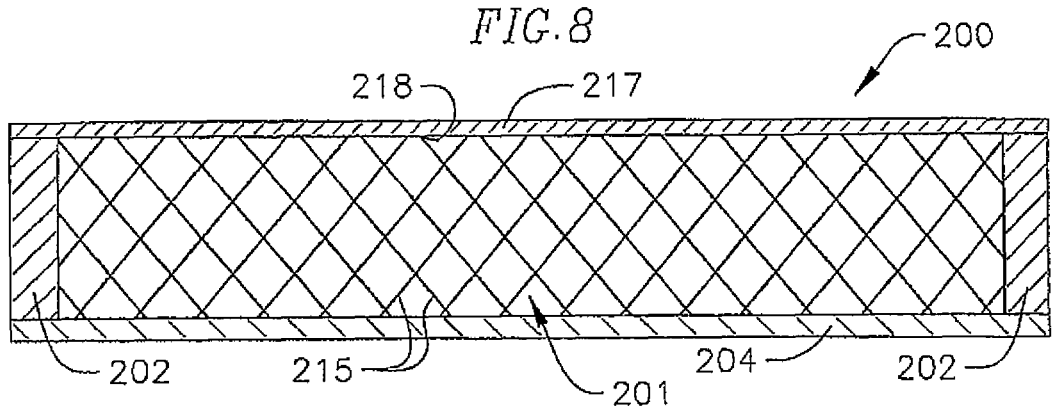
FIG. 8 illustrates a task of coupling an upper facesheet to the open cellular core and the cured polymer border, according to one embodiment of the present disclosure.

With reference now to the embodiment illustrated in FIG. 8, the method also includes a task of removing unpolymerized photo-monomer 206' from the reservoir 205, thereby leaving the polymer optical waveguides 215 defining the open cellular ordered three-dimensional microstructure core 201. The task of removing the unpolymerized photo-monomer 206' from the reservoir 205 may be performed by any suitable process, such as, for instance, applying a solvent that dissolves the unpolymerized photo-monomer 206' but not the polymer optical waveguides 215. The method may also include a task of removing the mask 207 and the mold 203 following the task of irradiating the volume of photo-monomer 206, 206' with the collimated light beams 210, 212 to form the open cellular core 201 and the cured, solid polymer border 202, respectively.

In one embodiment, peripheral portions 216 (see FIG. 7B) of the lower facesheet 204 that underlay the mold 203 may be removed such that the periphery of the lower facesheet 204 is aligned with the periphery of the cured, solid polymer border 202, as illustrated in FIG. 8 (i.e., the periphery 216 of the lower facesheet 204 may be trimmed such that the lower facesheet 204 does not extend out beyond the cured, solid polymer border 204). The peripheral portion 216 of the lower facesheet 204 that underlay the mold 203 may be removed by any suitable process, such as, for instance, machining (e.g., laser cutting or water jet cutting). In an alternate embodiment, the mold 203 may not be removed, and the lower facesheet 204 may not be trimmed.

With continued reference to the embodiment illustrated in FIG. 8, the method also includes a task of coupling an upper facesheet 217 to an upper surface 218 of the open cellular ordered three-dimensional polymer microstructure core 201 (i.e., the method includes a task of coupling the upper facesheet 217 to upper ends of the polymer optical waveguides 215). As described above, the upper facesheet 217 may have any suitable shape, such as, for instance, square, rectangular, circular, or even an irregular shape, and may have any suitable thickness, such as, for instance, from approximately or about 0.03 inches to approximately or about 0.25 inches. Although the upper facesheet 217 in the illustrated embodiment is flat, in one or more alternate embodiments the upper facesheet 217 may be non-planar (e.g., the upper facesheet 217 may be dome-shaped and/or may include compound out-of-plane curvature). Additionally, the upper facesheet 217 may be formed from any suitable material, such as, for instance, aluminum, steel, other metal alloys, carbon fiber reinforced plastic, unreinforced plastic, or any combination thereof. The task of coupling the upper facesheet 217 to the upper surface 218 of the open cellular core 201 may be performed by any suitable process, such as, for instance, welding (e.g., inert gas welding, linear friction welding, vibration welding, or friction-stir welding), brazing, bonding, or any combination thereof. In one embodiment, the upper facesheet 217, the lower facesheet 204, and the cured, solid polymer border 202 cooperate to form a fluid-tight seal around a periphery of the core 201.

Figure 9:
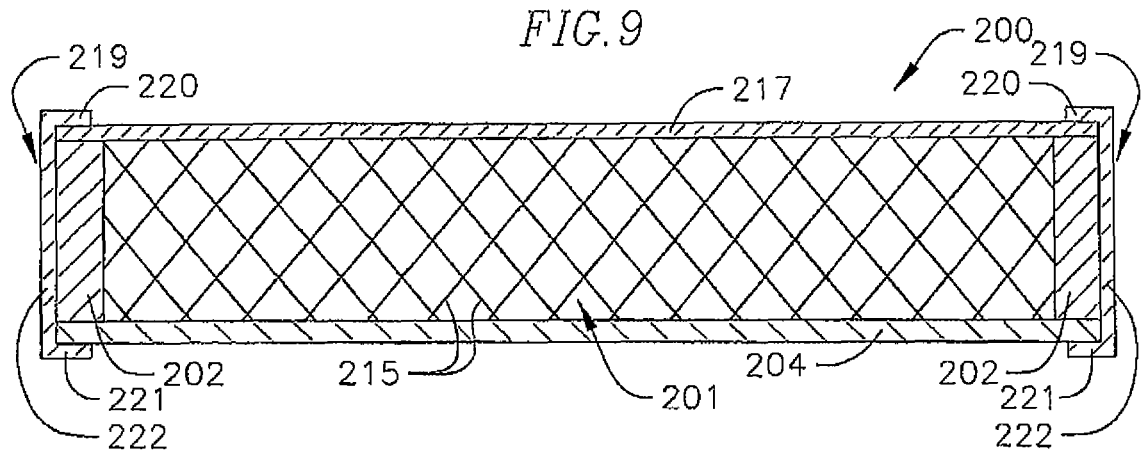
FIG. 9 illustrates a task of coupling a seal around a periphery of the upper and lower facesheet and the cured polymer border, according to one embodiment of the present disclosure.

With reference now to the embodiment illustrated in FIG. 9, the method of sealing a periphery of the sandwich structure 200 may also include a task of coupling a seal 219 around a periphery of the core 201 and the upper and lower facesheets 217, 204, respectively. In the illustrated embodiment, the seal 219 is a C-channel having an upper horizontal flange 220 overhanging and abutting the upper facesheet 217, a lower horizontal flange 221 underlying and abutting the lower facesheet 204, and a vertical wall 222 extending between the upper and lower flanges 220, 221. In the illustrated embodiment, the vertical wall 222 of the seal 219 abuts the outer edges of the upper and lower facesheets 217, 204, respectively, and the cured, solid polymer border 202. The seal 219 may be coupled to the upper and lower facesheets 217, 204, respectively, by any suitable process, such as, for instance, welding (e.g., inert gas welding, linear friction welding, vibration welding, or friction-stir welding), brazing, bonding, mechanical fastening, or any combination thereof. The seal 219 is configured to prevent fluid from diffusing through the cured, solid polymer border 202 and in to or out of the open cellular core 201 of the sandwich structure 200. The seal 219 may be formed from any material suitable for forming a fluid-tight seal, such as, for instance, metal (e.g., aluminum or steel), other metal alloys, or composite (e.g., carbon fiber reinforced plastic). Additionally, the seal 219 may have any suitable thickness, such as, for instance, from approximately or about 1/16 inch to approximately or about 1/2 inch. In one or more alternate embodiments, however, the method may not include a task of coupling a seal 219 around the periphery of the core 201 and the upper and lower facesheets 217, 204 (i.e., the sandwich structure 200 may be provided without the seal 219 and the cured, solid polymer border 202 may be configured to provide a sufficient fluid-tight seal around the periphery of the open cellular core 201).

With reference now to the embodiment illustrated in FIG. 10, the method may also include a task of forming a plurality of openings 223 (e.g., holes) in the cured, solid polymer border 202. In one embodiment, the openings 223 may be smooth holes. In another embodiment, the openings 223 may be internally threaded holes. Additionally, in one embodiment, the openings 223 may be through holes (i.e., the openings 223 may extend completely through the cured, solid polymer border 202). In an alternate embodiment, the openings 223 may be blind holes (i.e., the openings 223 may not extend completely through the cured, solid polymer border 202). Additionally, in an embodiment in which the sandwich structure 200 includes a seal 219, as illustrated in FIG. 9, the method may also include a task of forming openings in the upper and/or lower horizontal flanges 220, 221 of the seal 219 that are aligned with the openings 223 in the cured, solid polymer border 202. In one embodiment, the openings 223 in the cured, solid polymer border 202 may be configured to receive fasteners for coupling the sandwich structure 200 to another structure, such as, for instance, a structural component or subsystem of an automotive or aerospace vehicle. In another embodiment, the openings 223 in the cured, solid polymer border 202 may be configured to receive fasteners coupling the upper and lower facesheets 217, 204, respectively, to the cured, solid polymer border 202. The openings 223 in the cured, solid polymer border 202 may also be configured to receive fasteners coupling the seal 219 to the cured, solid polymer border 202. The openings 223 in the cured, solid polymer border 202 may be formed by any suitable process, such as, for instance, machining (e.g., drilling, laser cutting, or water jet cutting).

Figure 11A:
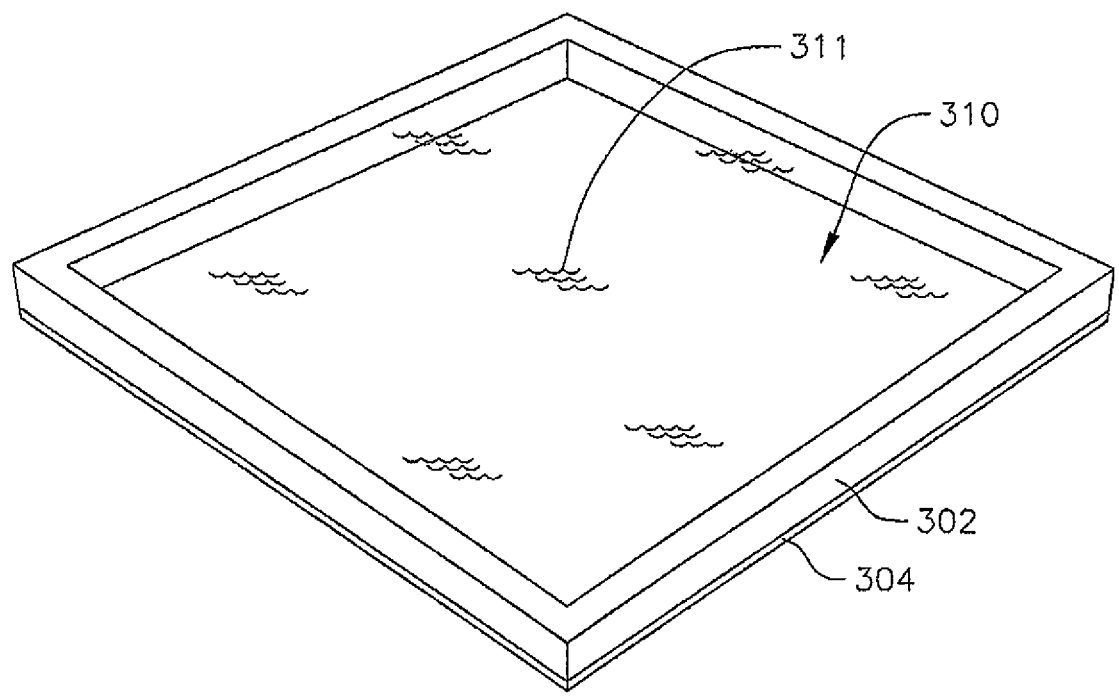
FIGS. 11A and 11B are a perspective view and a cross-sectional view, respectively, illustrating a task of coupling a sacrificial mold to a lower facesheet to form a reservoir and a task of filling the reservoir with a volume of liquid photo-monomer, according to another embodiment of the present disclosure.
Figure 11B:
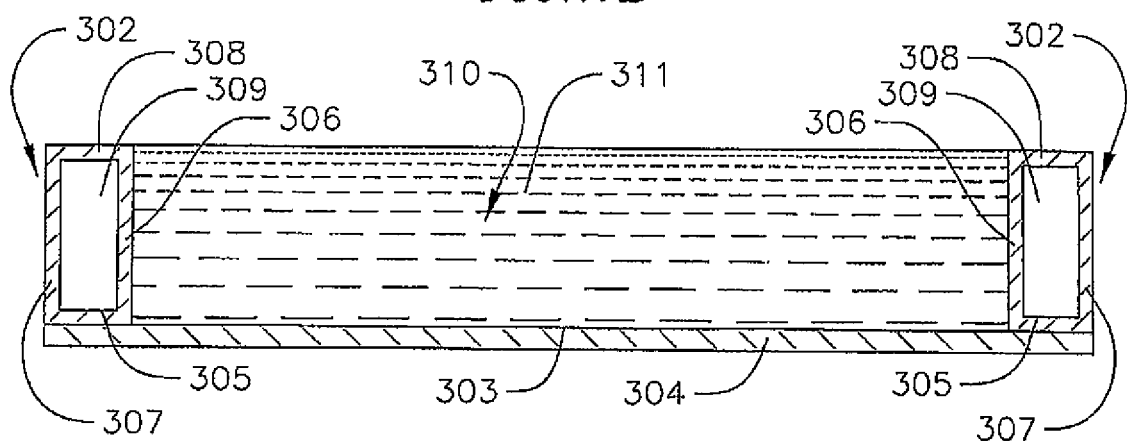

With reference now to FIGS. 11A and 11B, a method of sealing a periphery of a sandwich structure 300 having an open cellular core 301 according to another embodiment of the present disclosure includes using a sacrificial mold 302. In the illustrated embodiment, the method includes a task of selecting a sacrificial mold 302 having a desired size and shape, and a task of coupling the sacrificial mold 302 to an upper surface 303 of a lower facesheet 304. The lower facesheet 304 may have any suitable shape, such as, for instance, square, rectangular, circular, or even an irregular shape. Additionally, although the lower facesheet 304 in the illustrated embodiment is flat, in one or more alternate embodiments the lower facesheet 304 may be non-planar. For instance, in one embodiment, the lower facesheet 304 may be curved in three-dimensional space (e.g., the lower facesheet 304 may be dome-shaped and/or may include compound out-of-plane curvature). In the illustrated embodiment, the sacrificial mold 302 extends around a periphery of the lower facesheet 304. Additionally, in one embodiment, the shape of the sacrificial mold 302 conforms to the shape of the periphery of the lower facesheet 304. In an alternate embodiment, the shape of the sacrificial mold 302 may differ from the shape of the periphery of the lower facesheet 304.

In the embodiment illustrated in FIG. 11B, the sacrificial mold 302 is a rectangular tube having a lower horizontal wall 305, a pair of inner and outer vertical walls 306, 307 extending upward from opposite sides of the lower horizontal wall 305, and an upper horizontal wall 308 extending between upper ends of the vertical walls 306, 307. Together, the walls 305, 306, 307, 308 of the sacrificial mold 302 define an interior cavity 309. In one or more alternate embodiments, the sacrificial mold 302 may have any other suitable shape, such as, for instance, a square tube, a square bar, or a circular tube. The sacrificial mold 302 may be made of any suitable material, such as, for instance, metal (e.g., aluminum), other metal alloys, composite (e.g., carbon fiber reinforced plastic), polymer, or any combination thereof. The sacrificial mold 302 may be made by any suitable process, such as, for instance, casting, molding, forging, bending, stamping, machining, extruding, injection molding, welding, or any combination thereof. The sacrificial mold 302 may be coupled to the lower facesheet 304 by any suitable process, such as, for instance, welding (e.g., inert gas welding, linear friction welding, vibration welding, or friction-stir welding), brazing, bonding, mechanical fastening, or any combination thereof.

Additionally, the lower facesheet 304 and the sacrificial mold 302 may have any suitable sizes depending upon the desired size of the open cellular core 301. In one non-limiting embodiment, the sacrificial mold 302 is approximately or about 1 inch wide and approximately or about 1/2 inch tall and has an internal wall thickness of approximately or about 1/8 inch. The lower facesheet 304 may have any suitable thickness, such as, for instance, from approximately or about 0.03 inches to approximately or about 0.25 inches, depending upon the intended application of the sandwich structure 300.

Together, the sacrificial mold 302 and lower facesheet 304 define a reservoir or chamber 310, as illustrated in FIGS.

11A and 11B. The reservoir 310 may have any desired size, such as, for instance, approximately or about 9 inches wide and approximately or about 9 inches long, depending upon the intended application of the sandwich structure 300. In the illustrated embodiment, the method also includes a task of filling the reservoir 310 with a volume of liquid photo-monomer 311 that is configured to polymerize when exposed to light within a particular range of wavelengths (e.g., ultraviolet light).

Figure 12A:
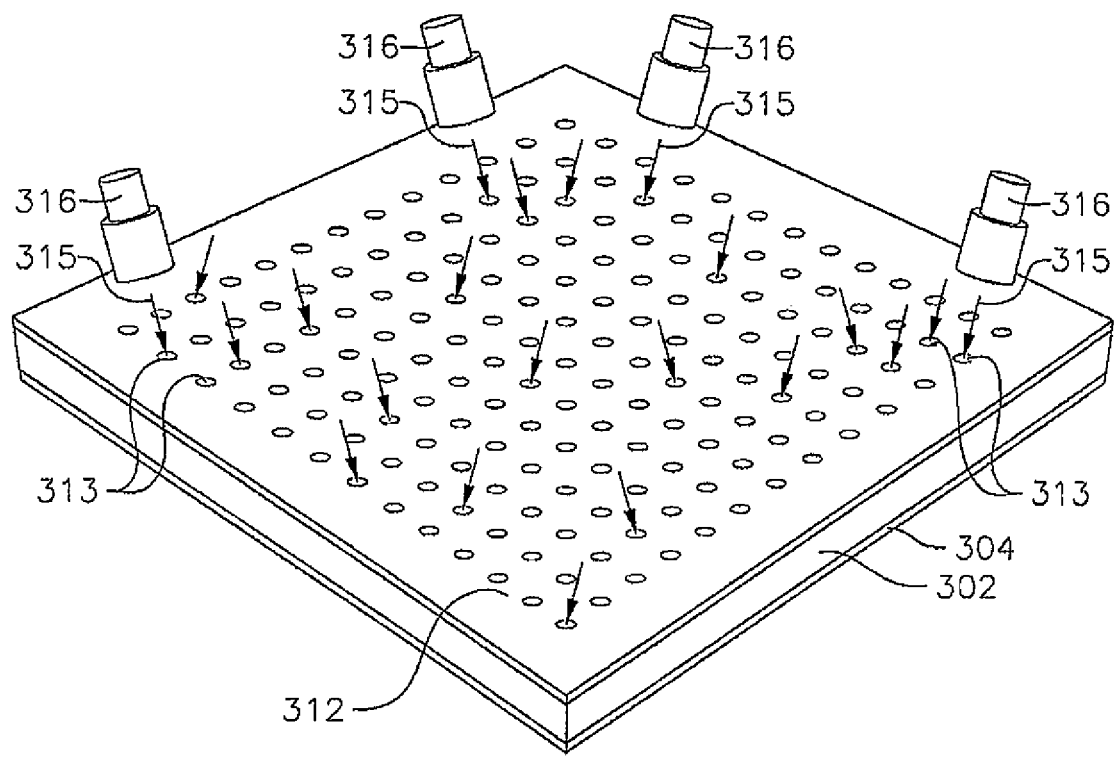
FIGS. 12A and 12B are a perspective view and a cross-sectional view, respectively, illustrating a task of covering the reservoir with a mask and a task of irradiating the photo-monomer by directing a plurality of vertical light beams down through a plurality of apertures in the mask to form an open cellular core, according to one embodiment of the present disclosure.
Figure 12B:
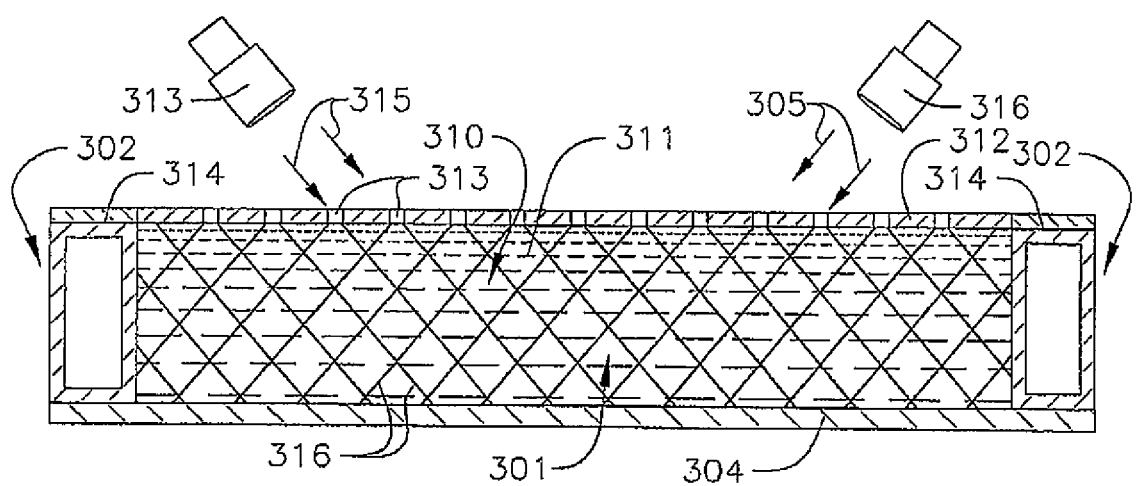

With reference now to the embodiment illustrated in FIGS. 12A and 12B, the method also includes a task of covering an upper end of the reservoir 310 with a mask 312 having a plurality of light-transmitting apertures 313 (i.e., the method includes a task of placing the mask 312 on an upper surface of the volume of photo-monomer 311 in the reservoir 310 and on an upper end 314 of the sacrificial mold 302). As described above, the mask 312 may define any desired number of apertures 313, the apertures 313 may have any desired spacing, and the apertures 313 may have any desired size and shape, depending upon the desired characteristics of the open cellular core 301.

With continued reference to the embodiment illustrated in FIGS. 12A and 12B, the method also includes a task of irradiating the volume of photo-monomer 311 in the reservoir 310 with a plurality of collimated light beams 315 (e.g., ultraviolet light beams) to form the open cellular core 301. The task of irradiating the photo-monomer 311 includes directing the collimated light beams 315 from one or more light sources 316 down through the one or more apertures 313 in the mask 312. Regions of the liquid photo-monomer 311 that are exposed to the collimated light beams 315 cure (i.e., polymerize) into a plurality of polymer optical waveguides 316. Together, the polymer optical waveguides 316 define the open cellular ordered three-dimensional polymer microstructure core 301 of the sandwich structure 300. In the illustrated embodiment, the polymer optical waveguides 316 cross or intersect each other and are polymerized together into a single, unitary lattice microstructure core 301. As described above, any suitable number of collimated light beams 315 may be directed into the volume of photo-monomer 311 and the collimated light beams 315 may be directed into the volume of photo-monomer 311 at any suitable angles depending upon the desired characteristics of the open cellular core 301.

Figure 13:
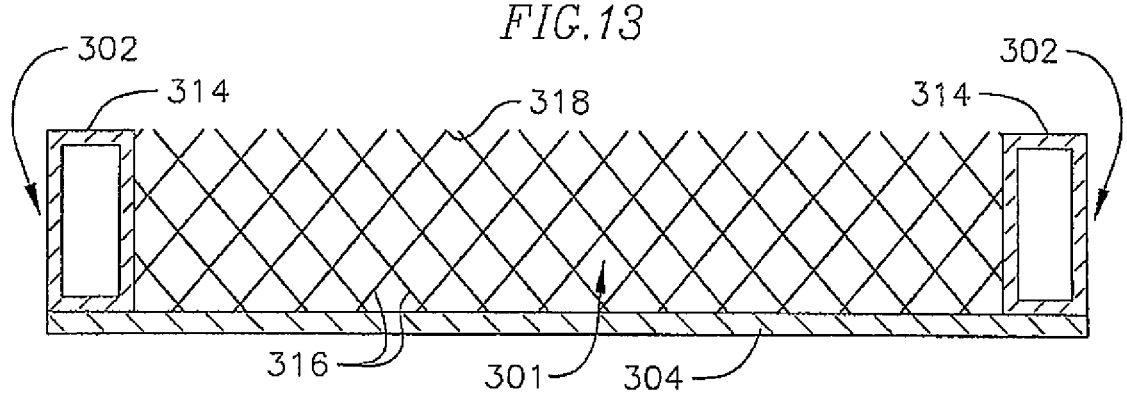
FIG. 13 illustrates a task of removing the mask and uncured photo-monomer from the reservoir, according to one embodiment of the present disclosure.

With reference now to the embodiment illustrated in FIG. 13, the method also includes a task of removing unpolymerized photo-monomer 311 from the reservoir 310, thereby leaving the polymer optical waveguides 316 defining the open cellular ordered three-dimensional microstructure core 301. The task of removing the unpolymerized photo-monomer 311 from the reservoir 310 may be performed by any suitable process, such as, for instance, applying a solvent that dissolves the unpolymerized photo-monomer 311 but not the polymer optical waveguides 316. The method may also include a task of removing the mask 312 following the task of irradiating the volume of photo-monomer 311 with the collimated light beams 315.

Figure 14:
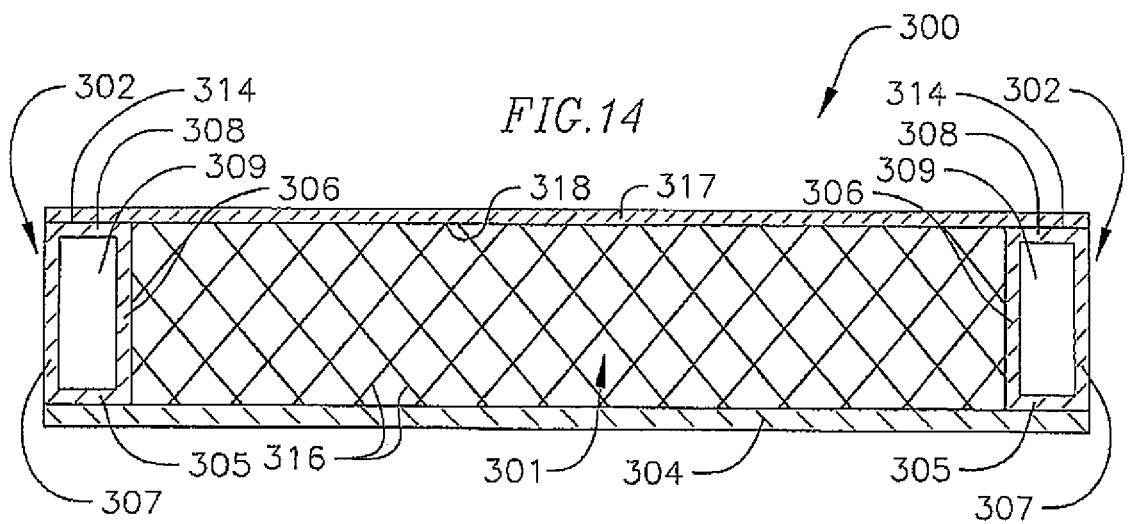
FIG. 14 illustrates a task of coupling an upper facesheet to the open cellular core and the sacrificial mold, according to one embodiment of the present disclosure.

With reference now to the embodiment illustrated in FIG. 14, the method also includes a task of coupling an upper facesheet 317 to an upper surface of the open cellular core 301 (i.e., upper ends 318 of the polymer optical waveguides 316) and the upper end 314 of the sacrificial mold 302. The upper facesheet 317 may have any suitable shape, such as, for instance, square, rectangular, circular, or even an irregular shape, and may have any suitable thickness, such as, for instance, from approximately or about 0.03 inches to approximately or about 0.25 inches. Additionally, although the upper facesheet 317 in the illustrated embodiment is flat, in one or more alternate embodiments the upper facesheet 317 may be non-planar (e.g., the upper facesheet 317 may be dome-shaped and/or may include compound out-of-plane curvature). The upper facesheet 317 may be coupled to the core 301 and the sacrificial mold 302 by any suitable process, such as, for instance, welding (e.g., inert gas welding, linear friction welding, vibration welding, or friction-stir welding), brazing, bonding, mechanical fastening, or any combination thereof. Additionally, in one or more embodiments, the upper facesheet 317 may be coupled to the core 301 and the sacrificial mold 302 by dissimilar processes. For instance, in one embodiment, the upper facesheet 317 may be bonded to the core 301 by an epoxy paste adhesive and welded to the sacrificial mold 302 by friction stir welding. In one embodiment, the upper facesheet 317, the lower facesheet 304, and the sacrificial mold 302 cooperate to form a fluid-tight seal around a periphery of the core 301.

Accordingly, unlike the embodiments described above in which the mold is removed after the task of irradiating the volume of photo-monomer with one or more collimated light beams to form the core, in the embodiment illustrated in FIGS. 11A-14, the sacrificial mold 302 is coupled to the upper and lower facesheets 317, 304, respectively, to form a liquid-tight seal around the periphery of the open cellular core 301. That is, in the embodiment illustrated in FIGS. 11A-14, the sacrificial mold 302 is used both to store the volume of photo-monomer 311 and to form a liquid-tight seal around the periphery of the open cellular core 301. The sacrificial mold 302 is configured to prevent liquid from diffusing through the sacrificial mold 302 and in to or out of the open cellular core 301, which might otherwise damage or degrade the core 301 and/or the environment surrounding the sandwich structure 300.

Figure 15:
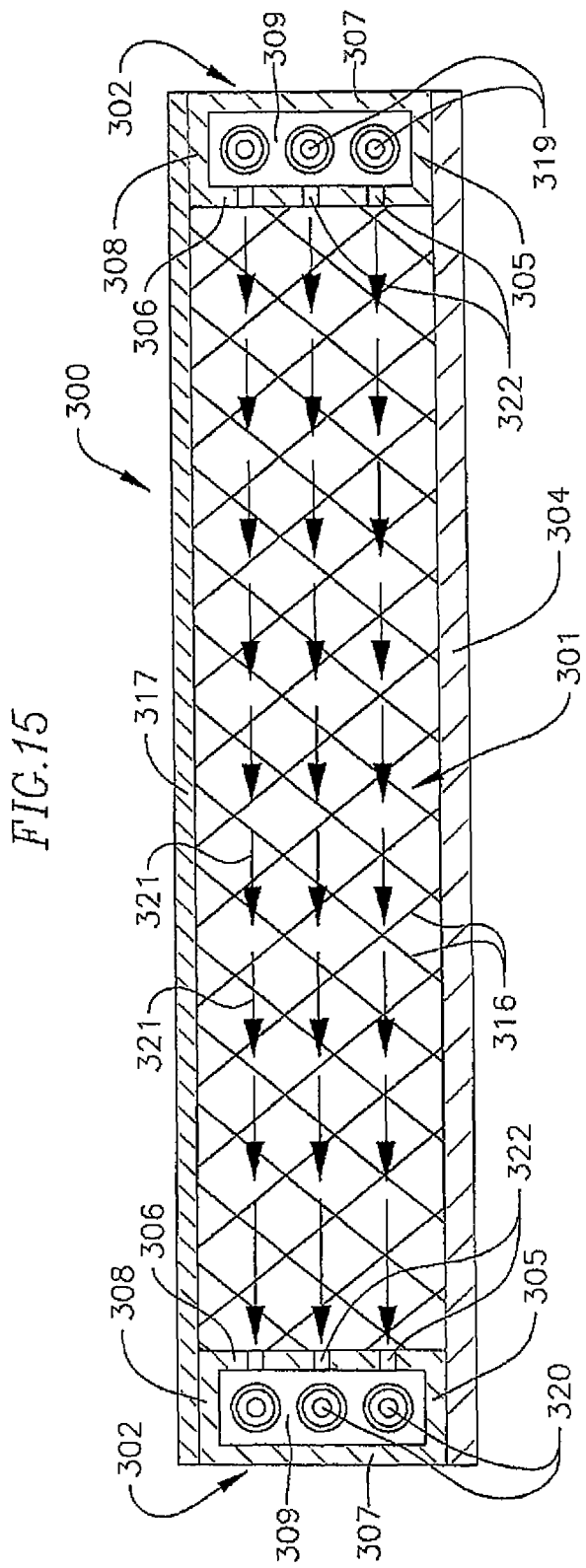
FIG. 15 illustrates the sandwich structure of FIG. 14 being used as a manifold.

In an embodiment in which the sacrificial mold 302 is hollow (e.g., the sacrificial mold 302 is a rectangular tube defining an interior cavity 309), the sacrificial mold 302 may be used as a manifold to control fluid flow into and/or out of the open cellular core 301 of the sandwich structure 300. Directing fluid flow into and/or out of the open cellular core 301 may be desirable, for instance, when the sandwich structure 300 is used as a heat exchanger or as a cold plate. In the embodiment illustrated in FIG. 15, the sandwich structure 300 includes one or more manifold inlet tubes 319 and one or more corresponding manifold outlet tubes 320 housed in the interior cavity 309 of the sacrificial mold 302. The inlet tubes 319 are configured to direct fluid 321 to flow through the open cellular core 301 and out through the outlet tubes 320. Additionally, in the illustrated embodiment, the inner vertical walls 306 of the sacrificial mold 302 include one or more openings 322 configured to allow the fluid 321 to flow into and out of the open cellular core 301.

The sandwich structures 100, 200, 300 formed according to the methods described above may be integrated into any desired structure, such as, for instance, aerospace or automotive vehicles. For example, the sandwich structures 100, 200, 300 of the present disclosure may be incorporated into automotive crush cans, door panels, structural naval components, and outer mold line aircraft components. The sandwich structures 100, 200, 300 of the present disclosure may be used as structural members. Additionally, because the open cellular microstructure core of the sandwich structures 100, 200, 300 is configured to permit fluid to flow through the core, the sandwich structures 100, 200, 300 of the present disclosure may also be used to perform additional functions, such as, for instance, acoustic isolation, active heating, active cooling, or fluid storage (e.g., a structural fuel tank).

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:
1. A sandwich structure, comprising:
a first facesheet having a contoured profile;
an ordered three-dimensional microstructure core defined by a plurality of interconnected polymer optical waveguides coupled to the first facesheet; and
a second facesheet coupled to the first facesheet, wherein the first and second facesheets cooperate to form a fluid-tight seal around a periphery of the core to prevent fluid ingress into the core,
wherein the ordered three-dimensional microstructure core is directly attached to the first facesheet, and
wherein each of the first and second facesheets comprises metal.

2. The sandwich structure of claim 1, wherein the first facesheet is a trapezoidal prism.
3. The sandwich structure of claim 1, wherein the first facesheet is a cuboid.
4. A sandwich structure, comprising:
a first planar facesheet;
an ordered three-dimensional microstructure core defined by a plurality of interconnected polymer optical waveguides coupled to the first planar facesheet;
a continuous border enclosing the ordered three-dimensional microstructure core coupled to the first planar facesheet; and
a second planar facesheet spaced apart from the first planar facehsheet, the second planar facesheet coupled to the continuous border, wherein the continuous border forms a fluid-tight seal around a periphery of the core,
wherein the first planar facesheet overlaps a first end of the continuous border,
wherein the second planar facesheet underlaps a second end of the continuous border,
wherein the first and second planar facesheets each comprises a first material and the continuous border comprises a second material different than the first material,
wherein the continuous border extends from the first planar facesheet to the second planar facesheet, and
wherein the ordered three-dimensional microstructure core is directly attached to the first planar facesheet and the continuous border.

5. The sandwich structure of claim 4, wherein the continuous border comprises solid photo-polymer.
6. The sandwich structure of claim 4, wherein the continuous border comprises a material selected from the group of materials consisting of metal, metal alloy, composite, polymer, and ceramic.
7. The sandwich structure of claim 4, further comprising a seal extending around a periphery of the continuous border and the first and second planar facesheets.
8. The sandwich structure of claim 4, wherein the continuous border comprises a rectangular tube defining an interior cavity.
9. The sandwich structure of claim 8, further comprising:
one or more manifold inlet tubes housed in the interior cavity and configured to direct fluid into the core; and
one or more corresponding manifold outlet tubes housed in the interior cavity and configured to direct fluid out of the core.
10. The sandwich structure of claim 8, further comprising a plurality of openings defined in the continuous border, and a plurality of fasteners extending into the plurality of openings and coupling the first and second planar facesheets to the continuous border.

* * * * *